United States Patent Office 3,737,402
Patented June 5, 1973

3,737,402
FLATTING AGENTS, FLATTING COMPOSITIONS
AND METHOD FOR THEIR PREPARATION
Edward R. de Vries, Lebanon, N.J., assignor to
Unifilm Corporation, Somerville, N.J.
No Drawing. Original application July 6, 1970, Ser. No. 52,749. Divided and this application Sept. 1, 1971, Ser. No. 177,160
Int. Cl. C08g 51/14, 51/15, 45/22
U.S. Cl. 260—29.2 TN                    5 Claims

ABSTRACT OF THE DISCLOSURE

Superior flattening agents for use in flatting compositions which provide smooth transparent flat coatings having improved resistance to whitening, burnishing and abrasion that withstand subjection to elevated temperatures without loss of flatness are discrete particles having a fine size range for about 0.02 to about 10 microns of a crystalline, thermoplastic, polar organic polymer having a softening point of from about 120° C. to about 240° C. which is insoluble in common coating solvents for film-forming organic binders and soluble only at elevated temperatures in strong organic solvents for organic polymers.

---

This application is a divisional application of my co-pending U.S. application Serial No. 52,749, filed July 6, 1970, and now abandoned.

The present invention relates to flatting agents, flatting compositions containing the flatting agents and a method for their preparation.

In order to provide protection and to produce a pleasing appearance, a variety of surfaces such as wood, metal, fabric, paper or plastics, are coated with clear flatting compositions containing dispersed or suspended particles of a flatting agent which reduces the gloss or sheen of the coating and the coated substrate, preferably without substantially reducing the transparency of the flat coating. For example, wood finishes which serve to protect the surface against abrasion and stain, yet do not conceal the beauty of the grain, are made to simulate desirable hand-rubbed finishes by incorporating flatting agents therein which normally are dispersed fine particles of such materials as silicas. The best effects are obtained with silicas of uniform particle size down to the submicron range. Small size and uniformity are necessary to achieve a smooth coating without white specks or without a graying effect which would detract from the appearance of the coating.

The same considerations apply, for example, to vinyl-coated fabrics, especially those which have a metallic colored coating thereon such as is common in automotive upholstery. A flat top coat is applied thereover to reduce gloss and to protect the colored coating, preferably with only minor changes in the apparent color, and no loss of metallic appearance.

There are many other similar commercial applications for flat coatings obtained from flatting compositions.

Widely used flatting agents for flatting compositions are finely divided particles of silicas, silicates, insoluble urea-formaldehyde resins, vinyl plastisol resins, polyethylene and polypropylene.

Each one of these flatting agents possesses undesirable features in certain applications which limit its usefulness. For example, silicas in a flat top coat for furniture upholstery can cause whitening when the upholstery is stretched during application; vinyl plastisol resins cannot be used in flatting compositions containing common coating solvents because they swell or dissolve the vinyl resin; polyethylene and polypropylene not only are inefficient flating agents, requiring relatively large quantities thereof to reduce the gloss of a flat coating or flat coated substrate, but they also exhibit poor adhesion to most coating or binder materials therefor, which shows up as whitening on stretching or scratching of the coating.

Burnishing, which is the increase in gloss of a flat coating containing a flatting agent when it is rubbed, is a persistent problem with the duller flat coatings. Moreover, a number of presently suggested flatting agents impart inadequate abrasion resistance to flat protective coatings made from flatting compoistions containing such flatting agents.

Therefore, it is the principal object of the present invention to provide a process for producing novel flatting agents, the flatting agents and flatting compositions containing the flatting agents which provide smooth transparent flat coatings having improved resistance to whitening, burnishing and abrasion that withstand subjection to elevated temperatures without loss of flatness.

The remarkable flatting agents of the invention are discrete particles having a fine size range from about 0.02 to about 10 microns, preferably a size range from about 0.5 to about 5 micorns, of a crystalline, thermoplastic, polar organic polymer having a softening point of from about 120° C. to about 240° C., preferably a softening point of from about 140° C. to about 200° C., which is insoluble in common coating solvents for film-forming organic binders and soluble only at elevated temperatures in strong organic solvents for organic polymers. These parameters of the flatting agents are prerequisites for the provision of a satisfactory and convenient method for their preparation in the form of discrete particles rather than gel or flocculant state. They are also necessary in order that the flatting compositions containing the flatting agents will provide smooth transparent flat coatings having excellent resistance to whitening, burnishing and abrasion that will withstand subjection to elevated temperatures without loss of flatness.

Typical useful preferred examples from an availability, cost and performance standpoint of such organic polymers are nylons and polyesters. Representative of the nylons are nylon-6,10, i.e., the copolymer of hexamethylene diamine with sebacic acid; nylon-6, i.e., polycaprolactam; nylon-6,6, i.e., the copolymer of hexamethylene diamine with adipic acid; and the like. Typical suitable polyesters include the condensate of ethylene glycol with a mixture of dibasic carboxylic acids comprising terephthalic acid and isophthalic acid, which mixture of dibasic carboxylic acids can also contain aliphatic dicarboxylic acids such as adipic acid and sebacic acid. Suitable organic polymers also include polyvinylidene chloride, polyacrylonitrile, and the like. Polymerized olefinic hydrocarbons, such as polyethylene, polypropylene and polystyrene, on the other hand, are not satisfactory organic polymers for the products of the present invention.

Common coating solvents for film-forming organic binders and strong organic solvents for organic polymers, referred to above in regard to the solubility properties of the organic polymer flatting agents, are conventional materials well known to the coating art. Thus, typical examples of the first type of solvent include the lower aliphatic hydrocarbons, such as hexane and octane; the lower aromatic hydrocarbons, such as toluol and xylol; the lower alkanols, such as ethanol and butanol; the lower aliphatic ketones, such as acetone and methyl ethyl ketone; the lower aliphatic esters, such as ethyl acetate and butyl acetate; the chlorinated lower aliphatic hydrocarbons, such as methylene chloride and trichloroethylene; as well as water. Representative examples of the second type of solvent include tetrahydrofuran, N - methyl pyrrolidone ("M-Pyrol"), N-methyl morpholine, cyclohexanone, dimethyl formamide, dimethyl sulfoxide, dioxane, and butyrolactone.

The flatting agents of the invention are prepared by dissolving the requisite organic polymer in a solubilizing amount of the above mentioned strong organic solvent for organic polymers at an elevated temperature, i.e., normally above 80° C. and more usually at about 120° C. to about 150° C. or higher. The strong organic solvent must be capable only at an elevated temperature of dissolving the particular organic polymer used and hence it is selected from among the above mentioned strong organic solvents with this objective or property in mind. After the solution is formed, there is added thereto one or more of the above mentioned common coating solvents for film-forming organic binders in which the organic polymer is insoluble and the solution allowed to cool to room temperature, i.e., about 20° C. During cooling the organic polymer unexpectedly precipitates as discrete, dispersed or suspended particles, rather than agglomerated or gel or flocculant particles, having a fine size range from about 0.02 to about 10 microns and usually having a fine size range from about 0.5 to about 5 microns. Thereafter, the particles of flatting agent may be separated from the liquid dispersion or suspension medium by suitable separation means, such as vacuum drying.

As an alternative, though less desirable procedure, the flatting agents are prepared by the above procedure which is modified by omitting the step of adding the common coating solvent to the solution of organic polymer. However, by this alternative procedure the organic polymer does not separate during the cooling of the solution thereof as discrete uniform fine size particles, but rather it separates out in a viscous or agglomerated form which then has to be subdivided to the necessary uniform fine size range of particles by dispersion or comminution, possibly followed by a classification step.

The flatting agent is used in flatting compositions. Such flatting compositions can be prepared by dispersing or suspending variable amounts, as desired for the degree of flatness, such as up to about 25% by weight, of the flatting agent in a liquid dispersion medium comprising the above mentioned common coating solvent for film-forming organic binders in which the flatting agent is insoluble. It is preferred that the common coating solvent liquid dispersion medium for the flatting agent in the flatting compositions be a mixture of toluol and acetone. The liquid dispersion medium can further contain a minor amount, i.e., up to about 40% by weight thereof, of the above mentioned strong organic solvent in which the flatting agent is soluble only at elevated temperatures. Therefore, as an alternative and preferred method for preparing the flatting compositions, the flatting agent can be left in the dispersed or suspended state in the cooled mixture of the common coating solvent and strong organic solvent medium in which it is precipitated or generated in situ in finely divided form.

The flatting composition can be used by blending it in variable amounts, as desired for the degree of flatness, with a clear coating composition containing a solubilized film-forming organic binder dissolved in the above mentioned common coating solvent therefor to provide a flatted coating composition. Alternatively, the flatting composition can have incorporated therein a solubilized film-forming organic binder so that the flatting composition can then serve as a top coat for a clear coating composition and thereby flatten the coating composition substrate.

In flatting compositions containing a solubilized film-forming organic binder, the flatting agent is present therein generally in an amount from about 5% to about 35% by weight based on the weight of the film-forming organic binder. The flatting compositions containing a film-forming organic binder can be prepared by blending the film-forming organic binder with the flatting compositions. However, it is preferred in order to simplify the processing steps to incorporate the film-forming organic binder in the above mentioned mixture of the common coating solvent and strong organic solvent in which the flatting agent is prepared prior to cooling that solution to cause precipitation and dispersion of the flatting agent discrete particles therein. This latter procedure is employed only when the film-forming organic binder is compatible with the flatting agent and hence does not cause gellation or agglomeration of the flatting agent during its precipitation.

It is preferred that the film-forming organic binder be a vinyl chloride polymer, such as polyvinyl chloride or copolymers of vinyl chloride and vinyl acetate containing a predominant amount of the vinyl chloride monomer. However, other suitable film-forming organic binders can be used such as polymethylmethacrylate and polyurethane.

A particularly advantageous variation of the flatting composition is one wherein the film-forming organic binder component is chemically reactive with the flatting agent component. Thus, when the flatting agent is a nylon or a polyester having an acid and/or hydroxyl number of 2 or 4 or higher, which therefore contain reactive hydrogen groups, namely, amide, carboxyl or hydroxyl groups, the film-forming organic binder can be a polyurethane, a urea-formaldehyde resin and the like, which is chemically reactive therewith because of the presence therein of free isocyanate groups, epoxy groups, methylol or methylol ether groups, imine groups, etc. Typical of the polyurethanes is a polyol adduct of tolylene diisocyanate. By chemically reacting the particles of flatting agent with the binder of the coating, a homogeneous composition is obtained, where the flattening agent is an integral part of the coating. This results in superior abrasion resistance and non-scuffing.

The flattening compositions can be further modified and improved by incorporating therein small quantities of the order of a few weight percent of additives. For example, dispersing agents such as metallic naphthenates may be used as deflocculating agents and aid in keeping the flatting agent in suspended or dispersed particulate state. Also small amounts of heat and light stabilizers for vinyl polymers can be present in the flatting compositions.

The flatting compositions can be applied to substrates such as fabric, wood, paper, metal, plastics, and the like, by conventional means including spraying, brushing, rollcoating and spreading.

The process and products of the invention will be further illustrated by the following representative examples thereof.

EXAMPLE 1

Fifty grams of a crystalline, thermoplastic, polar ethylene glycol terephthalate-isophthalate polyester having a softening point of 140° C. and fifty grams of another crystalline, thermoplastic, polar ethylene glycol terephthalate-isophthalate polyester having a softening point of 182° C. were dissolved in 100 grams of N-methyl pyrrolidone at 150° C. Then 200 grams of toluol were added slowly. When cooled to room temperature, this mixture was a soft pasty solid. Drying in a vacuum oven produced a powder having a particle size of 5–10 microns. This powder was dispersed in a standard vinyl-acrylic topcoat which gave a smooth flat finish on vinyl-coated fabric.

EXAMPLE 2

A crystalline, thermoplastic, polar ethylene glycol terephthalate-isophthalate-adipate polyester with a softening point of 145° C. to 150° C., an acid number of 4, and a hydroxyl number of 7 was used. Fifty grams of this polyester were dissolved in 50 grams of N-methyl pyrrolidone at 150° C., and 300 grams of toluol added. To this warm, hazy solution were added 300 grams of acetone, and the solution was cooled to room temperature. A milky white dispersion of the polyester having a particle size range of 0.5 to 6 microns was obtained. On standing for a long period of time, this dispersion had little tendency to settle out.

EXAMPLE 3

A crystalline, thermoplastic, polar nylon-6,10 having a softening point of 165° C. to 170° C., was dissolved in dimethyl formamide at 150° C., to form a 50% solids solution. To 100 grams of this hot solution were added 250 grams of toluol, and then 250 grams to acetone. On cooling to room temperature, a stable white dispersion of nylon particles in the 1 to 10 micron range was obtained.

EXAMPLE 4

A crystalline, thermoplastic, polar ethylene glycol terephthalate- isophthalate-sebacate polyester with a softening point of 135° C. to 140° C., an acid number of 5, and a hydroxyl number of 10 was used. The vinyl copolymer used was based on 93% vinyl chloride and 7% vinyl acetate. One hundred grams of the vinyl copolymer and 50 grams of the polyester were stirred in a mixture of 25 grams of M-Pyrol and 300 grams of toluol at a temperature of 120° C. until dissolved. Three hundred grams of acetone were added, and the solution cooled to room temperature to precipitate the polyester in dispersed state. Examination under the microscope showed the presence of particles almost all in the 1 to 10 micron size range. On coating vinyl-coated fabric therewith, a tough flat transparent finish was obtained, resistant to abrasion, and highly resistant to burnishing. When the film was subjected to an elevated temperature of 120° C., there was no loss of flatness.

EXAMPLE 5

A similar lacquer or flattening composition was made using a crystalline, thermoplastic, polar ethylene glycol terephthalic-isophthalic polyester with a softening point of 175° C. In this case, 50 grams of the polyester were dissolved in 50 grams of M-Pyrol at 120° C., and 300 grams of toluol added. Then 300 grams of acetone at ambient temperature were added to the hot solution, followed by 100 grams of the vinyl copolymer of Example 4. The vinyl copolymer was dissolved, 5 grams of zinc naphthenate added, and the batch was cooled to room temperature. As it cooled, the polyester precipitated in dispersed state. Under the microscope, the particles appeared to be almost completely in the 1 to 10 micron range. An excellent flat finish was obtained therefrom, which withstood heating at an elevated temperature of 150° C. without loss of flatness.

EXAMPLE 6

A clear vinyl top coat was made according to the following formula:

| Components: | Percent by weight |
|---|---|
| Copolymer of 91% vinyl chloride-9% vinyl acetate | 6.67 |
| Methyl methacrylate polymer-lacquer grade | 10.00 |
| Dioctyl phthalate or polyester plasticizer | 1.67 |
| Half-second cellulose acetobutyrate | 1.67 |
| Acetone | 46.50 |
| Toluol | 20.00 |
| Methyl ethyl ketone | 13.33 |
| Barium cadmium light stabilizer | 0.16 |
| Total | 100.00 |

This clear lacquer, when mixed in varying proportions, such as 1:1, with the flat lacquer of Examples 4 or 5, gave flat films with varying degrees of sheen, depending on the ratio of the Example 6 clear lacquer to the flat base lacquer of Examples 4 or 5.

The following three examples illustrate the use of binder systems which can react chemically with the flatting agent to form a dull coating with improved properties. In Examples 7 and 8, highly abrasion resistant coatings were obtained in which the isocyanate curing agent reacted with residual hydroxyl groups of the polyester flatting agent and the hydroxyl groups of the binder. In Example 9, the urea-formaldehyde resin reacted with the residual hydroxyl groups of the polyester flatting agent and of the cellulose acetate butyrate.

EXAMPLE 7

To 200 parts of the polyester dispersion of Example 2 were added 100 parts of a 20% Impranil CHW solution in acetone. (Impranil CHW is a hydroxy-terminated elastomer based on polyester and 1,5-naphthalene diisocyanate, and curable with isocyanate.) After dilution to coating viscosity, 20 parts of Mondur CB–75% (isocyanate terminated polyol adduct of tolylene diisocyanate) were added. The mixture was applied to vinyl film laminated to a fabric base. After evaporation of the solvent, the coating cured to produce an adherent, abrasion-resistant finish.

EXAMPLE 8

To 200 parts of the flatting composition of Example 5 were added 100 parts of a 20% Impranil CHW solution in acetone. (Impranil CHW is a hydroxy-terminated elastomer based on polyester and 1,5-naphthalene diisocyanate, and curable with isocyanate.) After dilution to coating viscosity, 20 parts of Mondur CB–75% (isocyanate terminated polyol adduct of tolylene diisocyanate) were added. The mixture was applied to vinyl film laminated to a fabric base. After evaporation of the solvent, the coating cured to produce an adherent, abrasion-resistant finish.

EXAMPLE 9

The polyester dispersion of Example 2 was mixed with cellulose acetate-butyrate, urea-formaldehyde resin thermosetting wood finish. When applied to wood and cured in the normal manner, the coating had abrasion resistance substantially better than that of a similar finish made with a dispersed silica as the flatting agent, apparently very largely because of chemical reaction between the polyester and the urea-formaldehyde resin.

EXAMPLE 10

The nylon dispersion of Example 3 was mixed with a clear nitrocellulose lacquer. This coating composition was applied to a wood surface previously treated with a standard sealer and sanded. A semigloss finish with excellent resistance to marring was obtained.

As illustrated above, the present invention provides a novel process, flatting agents and flatting compositions containing the flatting agents which provide coatings having improved resistance to whitening, burnishing and abrasion that withstand subjection to elevated temperatures without loss of flatness. The compositions are ideally suited for the flat coating of various substrates, particularly vinyl-coated fabrics and wood surfaces.

It will be appreciated that various modifications and changes may be made in the products and process of the invention by those skilled in the art in addition to those set forth above without departing from the essence of the invention and that accordingly the invention will be limited only within the scope of the appended claims.

What is claimed is:

1. A flatting composition which comprises:
   (a) dispersed discrete flatting agent particles having a fine size range from about 0.02 to about 10 microns of a crystalline, thermoplastic polar nylon or polyester organic polymer containing reactive hydrogen groups and having a softening point of from about 120° C. to about 240° C. which is insoluble in common coating solvents for film-forming organic binders and soluble only at elevated temperatures in strong organic solvents for said organic polymer;

(b) a solubilized film-forming organic binder chemically reactive with the flatting agent; and (c) a liquid dispersion medium comprising a common coating solvent for the film-forming organic binder in which the flatting agent is insoluble;

the amount of said flatting agent being from about 5% to about 35% by weight based upon the weight of the film-forming organic binder.

2. The flatting composition as defined by claim 1 wherein the film-forming organic binder contains chemically reactive isocyanate or methylol or methylol ether groups.

3. The flatting composition as defined by claim 2 wherein the flatting agent is a polyester.

4. The flatting composition as defined by claim 3 wherein the film-forming organic binder comprises a polyurethane.

5. The flatting composition as defined by claim 3 wherein the film-forming organic binder comprises a ureaformaldehyde resin.

References Cited

UNITED STATES PATENTS

| | | | |
|---|---|---|---|
| 2,945,840 | 1/1960 | Roberts et al. | 260—75 |
| 3,377,323 | 4/1968 | Ioka et al. | 260—78 |
| 3,379,695 | 4/1968 | Wolfes et al. | 260—78 |
| 3,510,457 | 5/1970 | Janssen et al. | 260—75 |
| 3,527,729 | 9/1970 | Bingham et al. | 260—37 N |
| 3,553,284 | 1/1971 | Riemhofer | 260—850 |
| 3,607,822 | 9/1971 | Tatatsecki-shi | 260—858 |

MORRIS LIEBMAN, Primary Examiner

S. L. FOX, Assistant Examiner

U.S. Cl. X.R.

260—33.8 R, 33.8 UR, 75 T, 78 R, 850, 858, 873